United States Patent Office 3,170,840
Patented Feb. 23, 1965

3,170,840
POLYVALENT VACCINE CONTAINING 1,1'-HEXAMETHYLENEBIS[5 - (p-CHLOROPHENYL)BIGUANIDE]
Eugene A. Timm, Grosse Pointe Woods, Mich., assignor to Parke, Davis & Company, Detroit, Mich., a corporation of Michigan
No Drawing. Filed Oct. 16, 1962, Ser. No. 231,044
9 Claims. (Cl. 167—78)

The present invention relates to injectable vaccines and to methods of preparing the same. More particularly, the invention relates to improved vaccines containing pertussis antigen, which vaccines, for prolonged periods prior to use, advantageously retain substantially undiminished antigenic potency and are protected against microbial contamination.

One of the recognized problems of commercial vaccine production is the provision of vaccines which are protected against microbial contamination not only during the process of manufacture, but also prior to use. Thus, while the conditions of manufacture and the resulting vaccine may be sterile, yet the vaccine can become contaminated during storage and use. For example, in the instance where the vaccine is packaged in a multiple dosage container and is free of contamination, the first dose or doses of the package may be dispensed under conditions such that the unused portion of the vaccine is exposed to accidental but unavoidable contamination occurring in the opening and handling of the container. The problem can ordinarily be overcome by including in the vaccine a self-sterilizing or antimicrobial agent. In general, however, germicides (including chlorine and the like) are unsuitable for preserving vaccines because they are with few exceptions incompatible with the antigens present. This is more likely to be the case with a product having more than one kind of antigen. The problem is increased for a vaccine product which also contains an adjuvant such as aluminum phosphate. One such product, for example, is poliomyelitis-diphtheria-pertussis-tetanus vaccine which contains three immunogenic types of poliomyelitis antigen, whole cell pertussis antigen, diphtheria toxoid, tetanus toxoid and aluminum phosphate.

Quite aside from antigenic compatibility is the problem that a particular germicide, although known to possess outstanding germicidal properties in the usual aqueous media such as water, saline, etc., may be unsuitable in this respect in a vaccine, particularly where the components of the vaccine may exert an adverse or nullifying effect on the germicide. And even where a germicide is found to be effective as a preservative for a vaccine, the minimum concentration at which it is effective is often too close to incompatible concentrations, thereby making it unsuitable for practical purposes, particularly from the standpoint of commercial vaccine production where relatively larger tolerances are ordinarily required.

Furthermore, antimicrobial agents which can be used as preservatives for vaccines of a particular type may not be suitable for vaccines of other types. For example, while there are some few, commercially accepted preservatives for pertussis vaccines, other bacterial antigens and certain viral antigens, experience has shown that these leave much to be desired as preservatives for poliomyelitis vaccines. Similarly, the reverse may be true. A case in point is the preservative known as benzethonium chloride which although entirely satisfactory when used with poliomyelitis vaccines, may not be completely acceptable with pertussis antigens, especially if used in too high a concentration. Because of incompatibility, the problem of preservation is particularly difficult for vaccines which include both poliomyelitis and pertussis antigens such as poliomyelitis-diphtheria-pertussis-tetanus vaccine. This incompatibility is manifested by agglomeration or clumping of the antigen and by loss of potency.

It is therefore an object of the present invention to provide aqueous polyvalent vaccines suitable for injection containing pertussis antigen which are antigenically stable for prolonged periods prior to use and which are protected against microbial contamination.

It is a further object to provide stable vaccines which contain pertussis antigen as well as other antigens such as poliomyelitis-diphtheria-tetanus and the like, and which are protected against microbial contamination.

Surprisingly, these objects, as well as other objects which will appear hereinafter, can be realized in accordance with the invention by incorporating in an aqueous polyvalent vaccine containing pertussis antigen, a water soluble salt of chlorhexidine in a concentration, grams per milliliter, in the range from about 1:3000 to 1:500,000. The preferred vaccines of the invention are those which contain the chlorhexidine salt in a concentration in the range from 1:50,000 to 1:100,000. The chemical name for chlorhexidine is 1,1'-hexamethylenebis[5-(p-chlorophenyl)biguanide].

Advantageously, the products of the invention not only are free of microbial contamination over long periods of storage and use but also retain their immunogenic potency. In contrast to this, vaccines which do not contain a preservative are subject to contamination by molds, bacteria and fungi whereas polyvalent vaccines which contain pertussis antigen with a preservative of the type now used are known to undergo an undue loss of potency over prolonged periods of storage.

For purposes of the invention, a pharmaceutically acceptable water soluble salt of chlorhexidine is employed, such as chlorhexidine dihydrochloride or chlorhexidine diacetate; commercially available, chemically pure chlorhexidine salts are satisfactory. The chlorhexidine salt can be incorporated into the vaccine in various ways. For example, it can be added portionwise at different stages of the production of the vaccine or the total quantity can be added in a single step. Where the production of the vaccine requires the pooling of separate aqueous components, the chlorhexidine salt can be added separately to each of these components prior to pooling. Incorporation of the chlorhexidine salt in the vaccine is preferably accomplished by slowly adding a dilute aqueous solution of the chlorhexidine salt to the vaccine or its aqueous components and by stirring sufficiently to assure complete mixing without causing foam formation.

As indicated, the invention is applicable to aqueous polyvalent vaccines containing pertussis antigen. The term "aqueous polyvalent vaccine" is used herein to mean an aqueous solution or suspension of pertussis antigen, together with other compatible non-viable immunogenic agents, which solution or suspension is suitable for injection and may optionally contain adjuvants such as protamine, aluminum phosphate, and the like. For purposes of illustration, the invention is described herein with reference to vaccines which contain not only pertussis antigen but also poliomyelitis antigens and diphtheria and tetanus toxoids. The invention is also applicable to vaccines of this type containing antigens which on administration characteristically provide immunity against disease and which are mutually compatible. The invention is particularly applicable to combination products containing an adjuvant for enhanced potency. The amounts of individual antigens present in the combination products of the invention are subject to variation in accordance with principles known to those skilled in the art, but in general are such as to provide, on a unit dosage basis, adequate antibody production when administered. Likewise, the proportion of adjuvant or adjuvants employed can be varied according to known principles.

The invention is illustrated by the following example:

(a) *Poliomyelitis vaccine.*—To each of ten bottles, each containing ten liters of cold non-viable polyvalent (types 1, 2 and 3) poliomyelitis vaccine without preservative [prepared as described by McLean and Taylor in Progress in Medical Virology, 1, 122–164 (1958), and conforming to the specifications and regulations of the Division of Biological Standards, United States National Institutes of Health], add 368 cc. of cold 0.2% aqueous protamine sulfate solution. Mix thoroughly but avoid foaming. To each of the ten bottles add five liters of 1% aluminum phosphate suspension (Holt's 7/8 suspension made as described below) containing chlorhexidine dihydrochloride in a concentration of 1 to 50,000. Mix thoroughly. Adjust the pH of each bottle to 5.0±0.1 with 0.1 N hydrochloric acid. Mix thoroughly while avoiding foaming and allow to stand undisturbed in the cold for twenty-four hours to provide for separation of a precipitate and a clear supernate. Mark the volume level of the supernate on the side of each bottle and carefully decant the supernate without disturbing the precipitate. Restore the volume of the suspension to the original mark by adding to each bottle cold, sterile Hank's balanced salt solution (without phenol red) containing chlorhexidine dihydrochloride in a concentration of 1 to 50,000 and having a pH of 5.0±0.1. Mix thoroughly without causing foaming and store in the cold for twenty-four hours, decant the supernate and hold the residual precipitate under cold storage (4° C.) for pooling.

Holt's 7/8 preparation, referred to above, is made under sterile conditions, as follows: 4500 g. of aluminum chloride hexahydrate is dissolved in sufficient water to make 270 liters (Solution A); 6202 g. of $$Na_3PO_4 \cdot 12H_2O$$

is dissolved in water to make 39.375 liters (Solution B) and this solution is filtered. The solutions are warmed to 37° C. and Solution B is added drop by drop to Solution A with stirring over a period of several hours. The mixture is held for 16 hours at room temperature, stirred and adjusted to pH 5.0 with 10 N sodium hydroxide solution. Sterile saline (90 liters; 0.9%) is added, with mixing, and the mixture is held for 5–7 days. Exactly 172.125 liters of the clear supernatant is removed. The desired aluminum phosphate suspension, which remains, is mixed well and sterilized for use by heating at 115° C. for 15 minutes after equilibration of temperature and pressure.

(b) *Diphtheria toxoid.*—To each of two bottles add 2,250 cc. of fluid diphtheria toxoid concentrate containing 1000 Lf units of diphtheria toxoid per cc. [prepared by the method of Holt, Developments in Diphtheria Prophylaxis, William Heineman Ltd., London, England, 1950, and conforming to the Minimum Requirements for Diphtheria Toxoid, 4th Revision (1947), Amendment No. 1 (1954), of the United States National Institutes of Health] and also containing chlorhexidine dihydrochloride in a concentration of 1 to 25,000; also add 337 cc. of dilute aqueous (0.2%) sterile protamine sulfate solution. Transfer the contents of one bottle to a third bottle and the contents of the other to a fourth bottle, the third and fourth bottles each containing five liters of 1% aluminum phosphate suspension (Holt's 7/8 preparation) and chlorhexidine dihydrochloride in a concentration of 1 to 50,000. Mix the contents of each bottle and adjust the hydrogen ion concentration, if greater than pH 5.5, to pH 5.0 with 0.1 N hydrochloric acid. Shake each bottle for twenty-four hours at 37° C. and hold the resulting mixture under cold storage for pooling.

(c) *Tetanus toxoid.*—To each of three bottles add five liters of tetanus toxoid concentrate containing 100 Lf units of tetanus toxoid per cc. [prepared by the general procedures of Mueller and Miller, J. Immunol., 50, pages 377–384 (1945), and J. Immunol., 56, pages 143–147 (1947), and conforming to the Minimum Requirements for Tetanus Toxoid, 4th Revision (1952), of the United States National Institutes of Health] and also containing chlorhexidine dihydrochloride in a concentration of 1 to 25,000; also add 75.0 cc. of sterile 0.2% aqueous protamine sulfate solution. Transfer the contents of each of the three bottles to a new set of three bottles each containing five liters of 1% aluminum phosphate suspension (Holt's 7/8 preparation) and chlorhexidine dihydrochloride in a concentration of 1 to 50,000. Mix the contents of each bottle and adjust the hydrogen ion concentration, if greater than pH 5.5, to pH 5.0 with 0.1 N hydrochloric acid. Shake each bottle for twenty-four hours at 37° C. and hold the resulting mixture under cold storage for pooling.

(d) *Pertussis suspension.*—Prepare Phase I cultures of *H. pertussis* in a Cohen-Wheeler liquid medium [American Journal of Public Health, 36, pages 371–376 (1946)], add formalin to the cultures to produce a concentration of 1 to 1,000, incubate at 37° C. for 48 hours and finally centrifuge to obtain detoxified *H. pertussis* cells. Prepare an *H. pertussis* suspension in 0.90% sterile saline containing 3 million billion of the cells and also containing chlorhexidine dihydrochloride in a concentration of 1 to 50,000. To this suspension add 300 cc. of 0.2% aqueous protamine sulfate solution. Mix thoroughly while avoiding foaming and hold the resulting mixture under cold storage for pooling.

(e) Pool all of the products of (a), (b), (c) and (d) above, in that order, in a single container, with thorough mixing after each addition but without causing foaming. Add sufficient sterile, 0.90% aqueous sodium chloride solution containing chlorhexidine dihydrochloride to bring the total volume to 150,000 cc. and the total chlorhexidine dihydrochloride concentration to 1:50,000. Mix thoroughly and adjust the pH to 7.1±0.1 by adding N/1 sodium hydroxide solution. Mix thoroughly, test for sterility and store in the cold. The resulting vaccine product, which can be filled into ampoules for distribution, contains in each 0.5 cc. dose diphtheria toxoid (15 Lf), tetanus toxoid (5 Lf), *H. pertussis* suspension (10 billion), and trivalent poliomyelitis antigen equivalent to 1 cc. of standard vaccine. In place of chlorhexidine dihydrochloride in the foregoing procedure, one can use other salts of chlorhexidine such as chlorhexidine di-acetate.

The polyvalent vaccine product produced by the above method possesses good self-sterilizing properties on storage, as determined by test procedures based on the method described by Rdyok et al., J. Am. Pharm. Assoc., Sci. Ed., volume 4, page 613, 1955. For example, when artificially contaminated with the several bacteria, yeasts and molds listed below, in separate tests in the following concentrations, and held for one month in sealed containers at 25° C., the product became completely self-sterilized.

| Organism: | Initial concentration (Organisms/ml.) |
|---|---|
| S. aureus | 70,000 |
| E. coli | 33,000 |
| Ps. aeruginosa | 33,000 |
| Proteus vulgaris | 56,000 |
| Kleb. pneumoniae | 48,000 |
| Sal. typhosa | 23,000 |
| Asp. niger | 130,000 |
| Pen. expansum | 65,000 |
| Saac. carlsbergensis | 190,000 |
| Saac. cerevisiae | 229,000 |

The product also possesses good storage stability with respect to toxoid content and antigenic potency. The potency for types, 1, 2 and 3 of poliomyelitis antigen was measured in terms of monkey potency factor by the standard method described in 21 Federal Register 4922. These potency factors substantially exceeded minimum requirements after six months' storage at 4° C.: type 1, 1.40; type 2, 4.40; and type 3, 2.16.

Pertussis potency and toxoid content also were favorably maintained during storage at 4° C., by comparison with a control vaccine identical to the above vaccine except for the omission of chlorhexidine. Standard assay tests were used, the assay for pertussis potency being run after five months' storage and for diphtheria and tetanus toxoids after 7½ months' storage. In the test used for pertussis potency [as specified in the Minimum Requirements for Pertussis Vaccine, 1st Revision (1952), of the United States National Institutes of Health] separate groups of mice are vaccinated with the test vaccine and a standard vaccine and are then challenged by injection with a virulent pertussis culture. The results are reported as pertussis units per total human dose. In the test for diphtheria toxoid content [as specified in the Minimum Requirements for Diptheria Toxoid, supra] the vaccine in an amount representing not more than one-half the total human immunizing dose, is injected into guinea pigs and the resulting antiserum is tested with toxin in guinea pigs by comparison with standard antitoxin of established unitage. The results are reported as diphtheria units per ml. of serum. In the test for tetanus toxoid content [as specified in the Minimum Requirements for Tetanus Toxoid, supra] the vaccine in an amount representing not more than one-half of the total human immunizing dose is injected into guinea pigs and the resulting antiserum is tested with respect to antioxin content as measured by survival of mice injected with toxin-serum mixtures in comparison with standard toxin-antitoxin mixtures. The results are reported as tetanus units per ml. of serum. The results obtained in these tests are summarized as follows:

| Poliomyelitis-Diphtheria-Pertussis-Tetanus Vaccine | Pertussis, units/T.H.D. | Diphtheria, units/ml. | Tetanus, units/ml. |
| --- | --- | --- | --- |
| Chlorhexidine (1:50,000) | 18.45 | 4+ | 4 |
| Control | 17.95 | 4 | 4+ |

The minimum standard for pertussis vaccine is 12 units and for diptheria and pertussis toxoids, 2 units. These results show that, within the limits of precision, the pertussis potency and the toxoid content of the product of the invention were favorably maintained above minimum standards at a level substantially the same as an identical vaccine without preservative, although the latter vaccine was undesirably subject to microbial contamination because it did not contain a self-sterilizing agent.

I claim:
1. An aqueous polyvalent vaccine comprising pertussis and poliomyelitis antigens, diphtheria and tetanus toxoids, and a water-soluble salt of 1,1'-hexamethylenebis[5-(p-chlorophenyl)biguanide] in a concentration in the range from 1:3000 to 1:500,000.

2. A vaccine according to claim 1 wherein the concentration of 1,1'-hexamethylenebis[5-(p-chlorophenyl)biguanide] salt is in the range from 1:50,000 to 1:100,000.

3. A vaccine according to claim 2 wherein the salt is 1,1'-hexamethylenebis[5-p-chlorophenyl)biguanide] hydrochloride.

4. A vaccine according to claim 1 containing types 1, 2 and 3 of poliomyelitis antigen.

5. A vaccine according to claim 1 containing an adjuvent selected from the group consisting of protamine sulfate and aluminum phosphate.

6. An aqueous polyvalent vaccine in multiple dosage form adapted for injection comprising pertussis antigen types 1, 2 and 3 of poliomyelitis antigen, diphtheria toxoid, tetanus toxoid, protamine sulfate and aluminum phosphate, and a water-soluble salt of 1,1'-hexamethylenebis[5-(p-chlorophenyl)biguanide] in a concentration in the range from 1:3000 to 1:500,000, the content of the individual antigens and toxoids being sufficient on a unit dosage basis to provide immunity when administered.

7. An aqueous vaccine in dosage form comprising pertussis antigen and a water-soluble salt of 1,1'-hexamethylenebis[5-(p-chlorophenyl)biguanide] in a concentration in the range from 1:3000 to 1:500,000.

8. A process for the sterilization of a vaccine comprising pertussis and poliomyelitis antigens and diphtheria and tetanus toxoids, which comprises incorporating in said vaccine a water-soluble salt of 1,1'-hexamethylenebis[5(p-chlorophenyl)biguanide] in a concentration of 1:3000 to 1:500,000.

9. A process according to claim 8 where the concentration of 1,1'-hexamethylenebis[5-(p-chlorophenyl)biguanide] salt is in the range of 1:50,000 to 1:100,000.

References Cited in the file of this patent
UNITED STATES PATENTS

| 2,793,160 | McLean | May 21, 1957 |
| 3,035,980 | Tint et al. | May 22, 1962 |
| 3,097,140 | Schuchardt | July 8, 1963 |

OTHER REFERENCES

Cyanamid, Chem. Abst., vol. 56, page 3576(f), 1962.
Schaaf: Chem. Abst., vol. 57, page 17197(e), 1962, citing Tijdschr Diergeneesk, vol. 85, 185–96, 1960.
Batson: Pediatrics, vol. 21, No. 1, pp. 1–6, January 1958.
Kendrick: Am. J. of Public Health, vol. 47, Part 1, April 1957, page 473.
Barrett: J. Am. Med. Assoc., vol. 167, No. 9, page 1107, June 28, 1958.
Lawrence: J. Am. Pharm. Assoc., Sci. Ed., RS–1A, 515, vol. 49, pp. 731–734, 1960.
Modern Drug, April 1962, p. 1241.
Maruzzella: Chem. Abst., vol. 54, p. 14353(c), 1960.
Modern, Chem, Abst., vol. 54, p. 14423(b), 1960.